United States Patent [19]

Zinner et al.

[11] Patent Number: 4,767,137
[45] Date of Patent: Aug. 30, 1988

[54] TUBE CONNECTING DEVICE

[75] Inventors: Hans Zinner, Dachau; Hans Kaupp, Aichach-Klingen, both of Fed. Rep. of Germany

[73] Assignee: MTU MOTOREN-und Turbinen Union Munchen GmbH, Munich, Fed. Rep. of Germany

[21] Appl. No.: 27,244

[22] Filed: Mar. 18, 1987

[30] Foreign Application Priority Data

Mar. 27, 1986 [DE] Fed. Rep. of Germany ....... 3610553
Oct. 7, 1986 [DE] Fed. Rep. of Germany ....... 3634113

[51] Int. Cl.4 .............................................. F16L 19/02
[52] U.S. Cl. ..................................... 285/325; 285/364; 285/404
[58] Field of Search ................... 285/19, 31, 325, 326, 285/327, 67, 103, 364, 365, 406, 407, 424, 404

[56] References Cited

U.S. PATENT DOCUMENTS

| 1,484,491 | 2/1924 | Gutermann | 285/406 |
| 3,185,506 | 5/1965 | Szloshta | 285/325 X |
| 3,656,782 | 4/1972 | Mollino | 285/404 X |
| 3,669,474 | 6/1972 | Bode . | |

FOREIGN PATENT DOCUMENTS

| 1035242 | 7/1958 | Fed. Rep. of Germany | 285/325 |
| 264936 | 9/1968 | Fed. Rep. of Germany . | |
| 2706105 | 8/1978 | Fed. Rep. of Germany | 285/365 |
| 750617 | 8/1933 | France | 285/365 |
| 2450524 | 10/1980 | France | 285/325 |
| 607455 | 8/1960 | Italy | 285/325 |

Primary Examiner—Dave W. Arola
Attorney, Agent, or Firm—Barnes & Thornburg

[57] ABSTRACT

A tube connecting device is provided that connects rectangular tube ends in a fluid-tight manner with one another. The tube ends communicate with one another at their ends in a tube connecting device. A first tube end has a frame that is open on one side, this frame having a circumferential groove. A second tube end has a circumferential flange that is received in the circumferential groove. This open side of the frame is covered by a sealing strip fastened thereto, this strip clampingly spanning adjacent portions of the frame and flange.

11 Claims, 3 Drawing Sheets

TUBE CONNECTING DEVICE

BACKGROUND AND SUMMARY OF THE INVENTION

The present invention relates to a tube connecting device for tubes which communicate at connecting tube ends and are coupled together by flanges in a fluid-tight manner.

Gas turbine power plants for fixed installations or for use in aircraft, for example, are equipped with heat exchangers in order to use a portion of the heat contained in the engine exhaust gas stream to heat the combustion air. Tubes and tube connections are required, for example, to conduct the exhaust gas stream toward the tube matrix of the heat exchanger through which the compressed air passes or to conduct it out of the matrix to an exhaust gas duct. They are also required, for example, to guide the heated compressed air emerging from the matrix to the corresponding consumer, in this case, the combustion chamber.

In all of these examples, the affected tubes and their flange connections must often be mounted or run under limited available installation space conditions. The scarce spatial installation conditions must mesh with the requirement that an affected tube flange connection be accessible for assembly and disassembly from only one side of the tube or from above or below, and at the same time satisfy the prerequisites for optimal fluid or gas sealing over the entire circumference of the tube flange connection. Particularly with respect to a hot gas stream to be conducted, a flange connection of this type must also be designed to be resistant to high temperatures and low in wear.

Previously known flange connecting designs, even for rectangular or square tube connecting cross-sections, do meet the requirement for good uniform sealing but also assume the presence of a plurality of screw connections uniformly distributed around the circumference, which therefore essentially necessitate accessibility from all sides to the tube flange connection for assembly or disassembly.

Within the framework of this problem, an object of the present invention is to provide a flange connecting device for tubes which communicate at connecting tube ends and are coupled together by flanges in a fluid-tight manner, which, despite being accessible exclusively from one side, either from above or below, is extremely easy to assemble or disassemble.

Another object of the present invention is to provide a flange connecting device that can be sealed around the entire opposite tube connecting circumference in optimal fashion, and is extremely temperature-resistant.

This and other objects of the present invention is achieved in the present invention by providing a tube connecting device for tubes which communicate at connecting tube ends and are coupled together by flanges with a first tube end having a frame that is open on one side. This frame has a circumferential groove. A second tube end is provided with a circumferential flange that is received in the circumferential groove. A strip covers the open side of the frame and clamps the frame and the flange.

By this invention, it is possible to slide one tube end provided with a flange from the accessible side or from above into the corresponding groove of the frame.

In certain preferred embodiments, a sealing cord is provided which reliably seals three sides of the tube as a result of a complete insertion of the flange into the corresponding frame spanning three sides of the tube.

A seal extending around the entire circumference is provided in preferred embodiments, in simple fashion by a cover strip which is screwed, for example, from above onto the open side of the frame. By this, the flange is tensioned in the circumferential groove of the frame spanning the three sides of the tube end and is also tensioned like a clamp in sealing fashion on the open insertion side to the other part of the frame. By using two or three screws for example, the cover strip and hence the entire flange connection, after the flange has been inserted, can be easily installed or removed, exclusively from one side or from above.

Other objects, advantages and novel features of the present invention will become apparent from the following detailed description of the invention when considered in conjunction with the accompanying drawings.

DETAILED DESCRIPTION OF THE DRAWINGS

Figure 1:
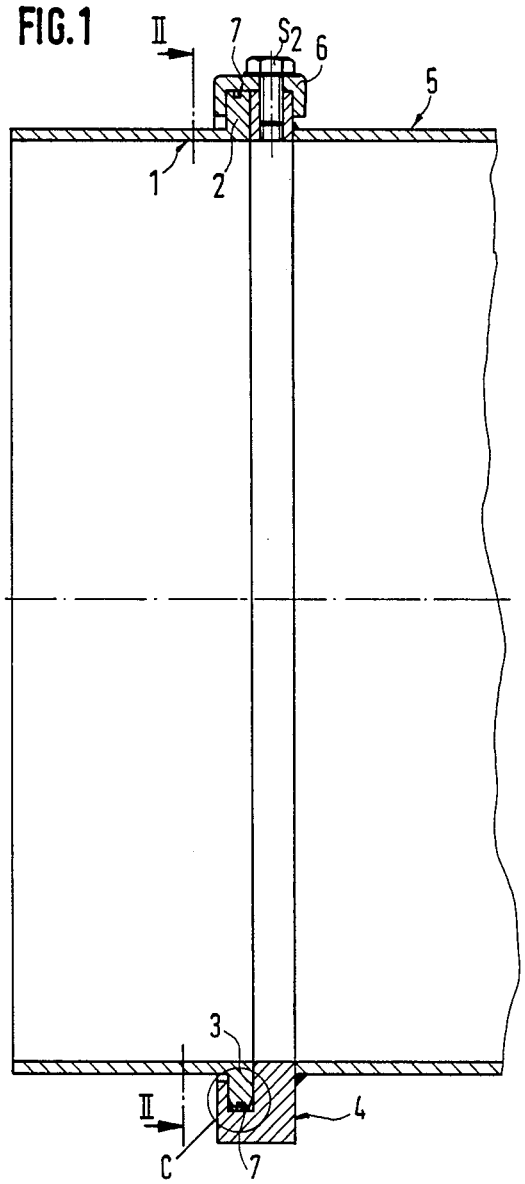
FIG. 1 is a view, in lengthwise cross-section, of a preferred embodiment of the present invention.
Figure 2:
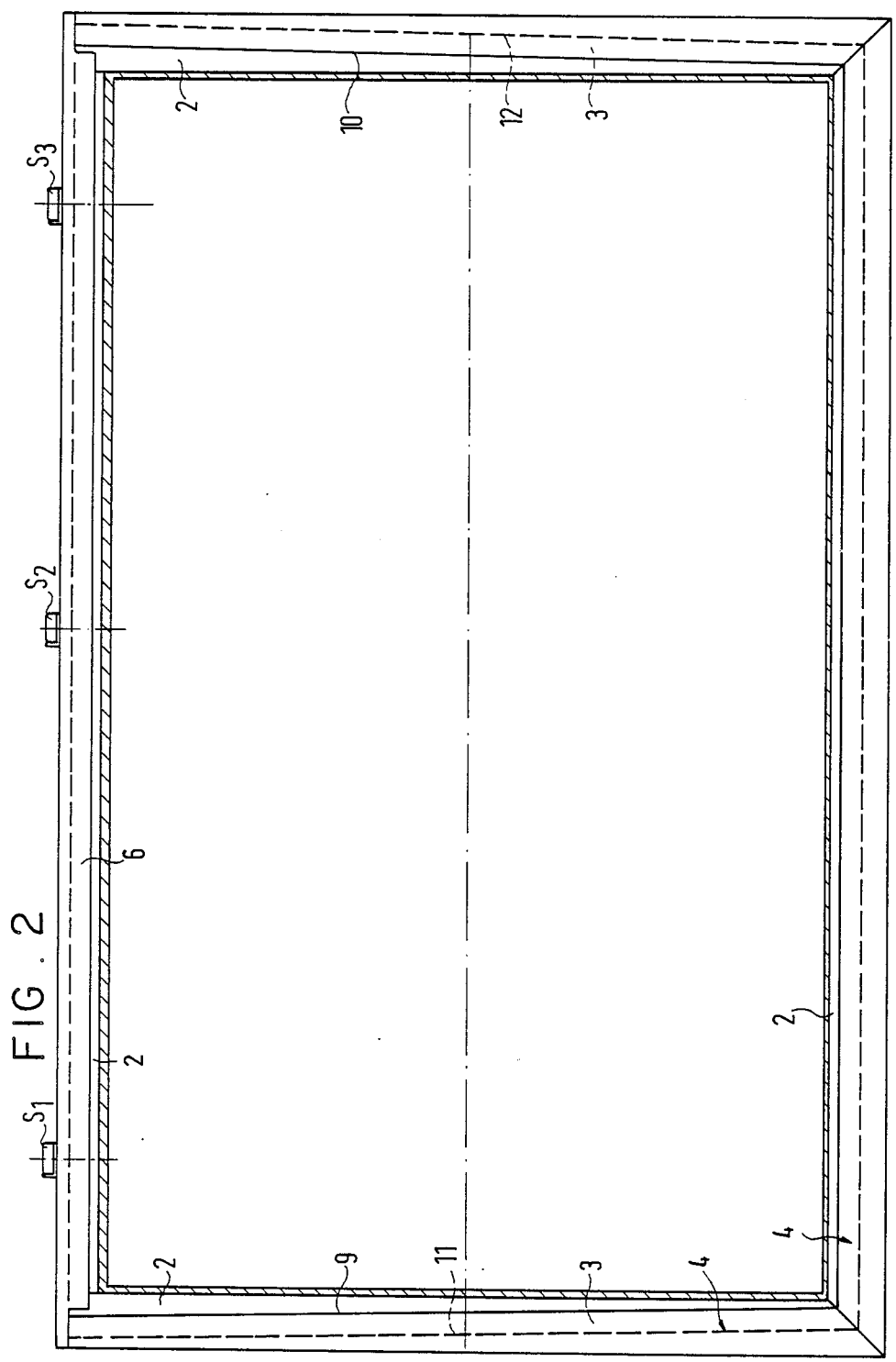
FIG. 2 is a section along line II—II in FIG. 1.

FIGS. 1 and 2 show the tube flange connection according to preferred embodiments of the present invention with rectangular tube connecting ends, for example.

A first tube end 1 is made in the form of a rectangular flange 2 which is pushed from outside into a circumferential groove 3 of a frame 4, spanning three of the end faces of the groove 3. The frame 4 is on a second tube end 5. The side of frame 4 which is open to the outside (the insertion side) after the insertion process is complete, is covered by a sealing strip 6. This sealing strip 6 is screwed, for example, onto the frame 4 by screws S1, S2 and S3. The strip 6 clampingly spans frame 4 and flange 2 along the remaining four end faces of both tube ends 1, 5.

Figure 3:
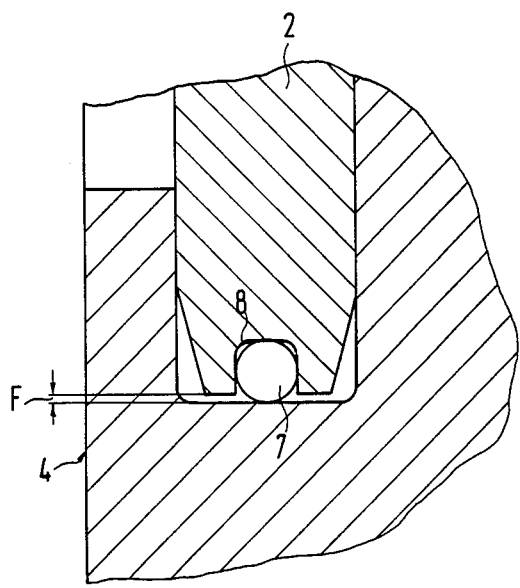
FIG. 3 shows the enlarged unit C in FIG. 1.

To provide a reliable seal of the tube flange connection, sealing means are provided between the outer end faces of flange 2 and the corresponding matching faces of frame 4 or sealing strip 6. For example, sealing cord 7 is provided in certain preferred embodiments as a sealing means (FIGS. 1 and 3). This cord 7 is at least partially embedded in the matching grooves 8 machined on the outside edge of flange 2. Sealing cord 7 should therefore be continuous and guided around the corresponding flange or groove corners. Depending on the required stiffness of the seal, a gap F (FIG. 3) in the operating state may be provided between the metal end faces of flange 2 and the corresponding groove bottoms.

As is best shown in FIG. 2, the parts of flange 2 which are opposite one another laterally, as viewed from sealing strip 6, are so designed that they taper gently and uniformly in the shape of a wedge in the direction of the groove bottom in frame 4 opposite sealing strip 6.

In addition, surface segments 9, 10 of frame 4 which are opposite one another, in addition to corresponding surface segments 11, 12 of circumferential groove 3 are made tapered like the corresponding flange parts, in certain preferred embodiments.

The slightly wedge-shaped taper favors assembly or disassembly and also produces an optimum uniform sealing fit of flange 2 in the circumferential groove 3 of frame 4 in an extremely advantageous manner.

The operationally desirable optimum sealing press fit is then achieved when sealing strip 6 is finally and permanently connected, in other words, screwed for example to the portion of frame 4 which is freely accessible from one side.

The invention is advantageously used for tubes which are completely square or rectangular. However, the invention can also be used advantageously in tubes which generally have a circular cross-section, whereby only the tube end sections adjacent to one another at the flange connection have square or rectangular cross sections.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed:

1. A tube connecting device for tubes having a central axis which tubes communicate at connecting tube ends and are coupled together by flanges in a fluid-tight manner, comprising:

a first said tube end having a frame that is open on only one side, said frame having a circumferential groove;

a second said tube end having a circumferential flange that is received in said circumferential groove;

said circumferential flange having radial outer end faces substantially parallel to said axis;

strip means for covering said open side of said frame and clamping said frame and said flange; and cord-like sealing means between radial outer end faces of said flange and corresponding matching faces of said frame and said strip means.

2. A tube connecting device according to claim 1, wherein said tube ends are rectangular, and said circumferential flange is rectangular.

3. A tube connecting device according to claim 2, wherein said strip means is screwed to said open side of said frame.

4. A tube connecting device according to claim 2, wherein said flange continuously and uniformly tapers from said strip means towards a side of said frame opposite said open side.

5. A tube connecting device according to claim 4, wherein surface segments of said frame located opposite one another, and corresponding surface segments of said circumferential groove, are continuously and uniformly tapered as is said flange.

6. A tube connecting device according to claim 2, wherein said strip means spans said frame and said flange.

7. A tube connecting device according to claim 1, wherein said sealing cord is at least partially embedded in grooves machines in a radially outer edge of said flange.

8. A tube connecting device according to claim 1, wherein said frame and said flange are clamped together exclusively by screw means through said strip means at said open side of said frame, whereby assembly and disassembly can be accomplished from said open side without requiring access to other portions of said frame and flange.

9. A method for connecting tubes which communicate at connecting tube ends and are coupled together by flanges in a fluid-tight manner, said tubes having a central axis with a first said tube end having a frame that is open on one side, said frame having a circumferential groove, and a second tube end having a circumferential flange with a radial outer end face substantilly parallel to said tube axis, and strip means, said method comprising:

inserting said circumferential flange into said circumferential groove;

covering said open side of said frame and clamping said frame and said flange with said strip means; and interposing cord-like sealing means between radial outer end faces of said flange and corresponding matching faces of said frame and said strip means.

10. A method according to claim 9, wherein said strip means is screw fastened to said frame.

11. A method according to claim 9, wherein said interposing cord-like sealing means comprises sealing three faces of said frame to said flange with said sealing cord.

* * * * *